UNITED STATES PATENT OFFICE 2,202,686

WETTING AGENT AND METHOD OF PRODUCING THE SAME

Joseph N. Borglin, Wilmington, Del., assignor to Hercules Powder Company, Wilmington, Del., a corporation of Delaware No Drawing. Application November 4, 1937, Serial No. 172,859

17 Claims. (Cl. 260—505)

This invention relates to substituted diaryl and aryl-alkyl ether sulfonic acids and more particularly to condensation products of terpene and diaryl or aryl-alkyl ether sulfonic acids and a process for making the same.

I have found that aromatic compounds substituted in the nucleus by a terpene radical may be obtained by condensing a diaryl or an alkylaryl ether with terpenes or with oxygenated derivatives thereof in the presence of a suitable acid condensing agent. I have also found that the resulting condensate may be converted into sulfonic acid derivatives by treatment with ordinary sulfonating agents or the process of condensation and sulfonation may be conducted simultaneously or the process may also be carried out by reacting a sulfonic acid derivative of a diaryl or an alkyl-aryl ether with a terpene or with an oxygenated derivative thereof in the presence of a suitable acid condensing agent.

The process in accordance with the present invention is applicable to suitable diaryl or alkylaryl ethers which I have found to be sulfonatable, among which are, for example, diphenyl ether, methylphenyl ether, ethylphenyl ether, butylphenyl ether and amylphenyl ether.

Among the terpene compounds which I have found suitable for the condensation are pinene, dipentene, terpinene, terpinolene, terpineol, borneol, fenchyl alcohol, terpin, terpin hydrate and crude materials rich in terpenes such as pine oil and turpentine.

Among the substances which are suitable condensing agents in the method in accordance with this invention are: p-toluene sulfonic acid, sulfuric acid, chlorsulfonic acid, phosphoric acid, hydrochloric acid, aluminum chloride, zinc chloride, etc.

Among the sulfonating agents suitable in accordance with this invention are chlorsulfonic acid, sulfuric acid, sulfur trioxide, oleum, etc.

In proceeding in accordance with one of the procedures of this invention I take a terpene such as, for example, pinene, and condense this with a diaryl ether or with an alkyl-aryl ether in the presence of a condensing agent such as mentioned before. I have found that the condensation may take place at temperatures ranging from about 100° C. to about 300° C. depending upon the condensing agent being used. When operating, for example, with p-toluene sulfonic acid as the condensing agent, I have found that the preferred temperature range is from about 200° C. to about 220° C.

The resultant condensate is then treated with a sulfonating agent selected from the group above mentioned. The sulfonation reaction may be carried out at temperatures ranging from about —20° C. to +50° C., but I prefer using a temperature from about —5° C. to about +35° C. If desired the sulfonated condensate so formed may then be neutralized with a base, such as, for example, sodium hydroxide, potassium hydroxide, triethanolamine, tetramethyl-ammonium hydroxide, trimethylbenzyl-ammonium hydroxide, etc. After drying, a product results having good emulsifying and wetting out properties.

As an alternative procedure in accordance with this invention, I may also simultaneously conduct the condensation and sulfonation of a terpene and a diaryl ether or an alkyl-aryl ether. In this case the reaction temperatures will desirably, although not necessarily, be in the range mentioned above for the sulfonation reaction alone. As a further alternative procedure in accordance with this invention, I may first sulfonate the diaryl ether or the alkyl-aryl ether and then condense the resultant product with a terpene.

Furthermore, I have found that the above condensation products may, if desired, be further modified by condensation with an aldehyde, preferably, although not necessarily, an alkyl aldehyde, such as, for example, formaldehyde, acetaldehyde, etc., prior to or subsequent to any neutralization of the sulfonated condensate.

All of the condensations and sulfonations described above may also be carried out in the presence of an inert solvent, such as, for example, ethylene dichloride, carbon tetrachloride, etc.

Lightness in color of the products obtained by the method in accordance with this invention may be attained (1) by using terpenes which have been purified by steam distillation or by steam distillation in the presence of a base such as sodium hydroxide, potassium hydroxide, etc., (2) by using freshly distilled diaryl or alkyl-aryl ethers, (3) by conducting the reactions in the presence of an inert atmosphere such as carbon dioxide or nitrogen.

Having now described in a general way the nature of this invention, I will now proceed to a more detailed disclosure thereof with reference to various examples, illustrating the practical adaptation of the invention. All parts shown are parts by weight.

Example I 180 parts of pinene, steam distilled in the presence of sodium hydroxide, was heated for four hours in an autoclave at 210° C. with 200 parts of diphenyl ether in the presence of 5 parts of p-toluene sulfonic acid. The excess pinene and diphenyl ether were then removed by steam distillation and the condensate washed with water, the resultant yield of condensate being 96 parts.

Then 80 parts of the above product dissolved in 300 parts of carbon tetrachloride was sulfonated by adding 33 parts of chlorsulfonic acid at 27° C. to 30° C. maintaining the mixture at such temperature for one-half hour, then neutralizing the product with sodium hydroxide and drying, obtaining 75 parts of the product.

Example II 350 parts of pinene, steam distilled in the presence of sodium hydroxide, was heated for four hours in an autoclave at 210° C. with 200 parts of diphenyl ether in the presence of 5 parts of p-toluene sulfonic acid. After removal of the excess pinene and diphenyl ether by steam distillation, and washing with water, the yield of condensate obtained was 399 parts.

Example III 100 parts of the condensate, prepared as shown in Example II dissolved in 300 parts of carbon tetrachloride was sulfonated by adding 27 parts of chlorsulfonic acid at 27° C. to 30° C., maintaining the mixture at such temperature for one-half hour, then neutralizing with sodium hydroxide and drying, obtained 92 parts of the product.

Example IV 100 parts of the condensate, prepared as shown in Example II, dissolved in 300 parts of carbon terachloride was sulfonated by adding 58 parts of chlorsulfonic acid at 27° C. to 30° C., maintaining the mixture at such temperature for one-half hour, then neutralizing with sodium hydroxide and drying, obtaining 117 parts of the product.

Example V 100 parts of the condensate, prepared as shown in Example II, dissolved in 300 parts of carbon tetrachloride was sulfonated by adding 50 parts of chlorsulfonic acid at 27° C. to 30° C., maintaining the mixture at such temperature for one-half hour, then neutralizing with sodium hydroxide, further treating the product so formed with 35 parts of a 40% by weight solution of formaldehyde at 20° C. to 25° C., and drying this reaction product.

Example VI 200 parts of a mixture containing 115 parts of pinene, 83 parts of methylphenyl ether and 2 parts of p-toluene sulfonic acid was treated with 170 parts of 100.9% sulfuric acid at 15° C. to 20° C., maintaining the mixture at such temperature for one hour. The reaction product was then neutralized with sodium hydroxide, separated from inorganic salts by extraction with alcohol and dried, the final product being substantially free from inorganic salts.

Example VII

A mixture of 85 parts of diphenyl ether and 150 parts of pinene was reacted with 150 parts of 101% sulfuric acid at 25° C. to 30° C. The sulfuric acid was added dropwise over a period of about one hour, mechanically stirring the reaction mixture throughout this time. The so formed sulfonated pinene-phenyl ether condensate was then recovered by steam distilling off the excess pinene and diphenyl ether.

Example VIII 50 grams of the condensate, prepared as shown in Example VII, was made slightly alkaline to methyl orange by adding thereto 160 cc. of a 40% aqueous solution of trimethylbenzyl ammonium hydroxide. The resulting product was then dried, yielding 73 grams of a white, somewhat flaky solid.

Example IX 50 grams of the condensate, prepared as shown in Example VII, was made slightly alkaline to methyl orange by adding thereto 50 cc. of triethanolamine. This mixture was placed in a vacuum oven for 8 hours at the end of which time 69 grams of a pale yellow liquid were obtained.

The products obtained in accordance with this invention in the form of the free acids or of products obtained by neutralization of the free acids with a suitable base produce clear solutions in water and show excellent wetting, emulsifying and cleansing properties. Furthermore, the emulsifying action of these products, especially at low concentrations of emulsifier, is superior to that of the prior art emulsifiers.

It will be understood that the examples shown are by way of illustration and that I do not limit myself to the temperatures, times, quantities, reactants, or steps of procedure set forth above.

What I claim and desire to protect by Letters Patent is:

1. The process of preparing sulfonic acids of high wetting, cleansing and emulsifying properties which includes the step of condensing a terpene with an ether containing an aryl group and the step of sulfonating the said aryl group.

2. The process of preparing sulfonic acids of high wetting, cleansing and emulsifying properties which consists in condensing a terpene with a compound from the group consisting of diaryl ethers and alkyl-aryl ethers and sulfonating the product.

3. The process of preparing sulfonic acids of high wetting, cleansing and emulsifying properties which consists in simultaneously condensing and sulfonating a mixture of a terpene and a compound from the group consisting of diaryl ethers and alkyl-aryl ethers.

4. The process of preparing sulfonic acids of high wetting, cleansing and emulsifying properties which consist in sulfonating a compound from the group consisting of diaryl ethers and alkyl-aryl ethers and then condensing with a terpene.

5. A product from the group consisting of the product obtained by the process of claim 1 and the product obtained by neutralizing with a suitable base the product obtained by the process of claim 1.

6. The process of preparing sulfonic acids of high wetting, cleansing and emulsifying properties which consists in condensing a terpene with diphenyl ether and sulfonating the product.

7. A product from the group consisting of the product obtained by the process of claim 6 and the product obtained by neutralizing with a suitable base the product obtained by the process of claim 6.

8. The process of preparing sulfonic acids of high wetting, cleansing and emulsifying properties which consist in condensing a terpene with methylphenyl ether and sulfonating the product.

9. A product from the group consisting of the product obtained by the process of claim 8 and the produce obtained by neutralizing with a suitable base the product obtained by the process of claim 8.

10. The process of preparing sulfonic acids of high wetting, cleansing and emulsifying properties which consists in condensing pinene with a compound from the group consisting of diaryl ethers and alkyl-aryl ethers and sulfonating the product.

11. A product from the group consisting of the product obtained by the process of claim 10 and the product obtained by neutralizing with a suitable base the produce obtained by the process of claim 10.

12. The process of preparing sulfonic acids of high wetting, cleansing and emulsifying properties which consists in condensing pinene with diphenyl ether and sulfonating the product.

13. A product from the group consisting of the product obtained by the process of claim 12 and the product obtained by neutralizing with a suitable base the produce obtained by the process of claim 12.

14. The process of preparing sulfonic acids of high wetting, cleansing and emulsifying properties which consists in condensing pinene with methylphenyl ether and sulfonating the product.

15. A product from the group consisting of the product obtained by the process of claim 14 and the product obtained by neutralizing with a suitable base the product obtained by the process of claim 14.

16. The process of preparing sulfonic acids of high wetting, cleansing and emulsifying properties which consists in condensing a terpene with a compound from the group consisting of diaryl ethers and alkyl-aryl ethers, sulfonating and condensing the reaction product with an aldehyde.

17. A product from the group consisting of the product obtained by the process of claim 16 and the product obtained by neutralizing with a suitable base the product obtained by the process of claim 16.

JOSEPH N. BORGLIN.

---

CERTIFICATE OF CORRECTION.

Patent No. 2,202,686.  May 28, 1940.

JOSEPH N. BORGLIN.

It is hereby certified that error appears in the printed specification of the above numbered patent requiring correction as follows: Page 3, first column, lines 4 and 16, and second column, line 1, claims 9, 11, and 13 respectively, for the word "produce" read --product--; and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.

CERTIFICATE OF CORRECTION.

Patent No. 2,202,686. May 28, 1940.

JOSEPH N. BORGLIN.

It is hereby certified that error appears in the printed specification of the above numbered patent requiring correction as follows: Page 3, first column, lines 4 and 16, and second column, line 1, claims 9, 11, and 13 respectively, for the word "produce" read --product--; and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.